US010356319B2

(12) United States Patent
Kimber et al.

(10) Patent No.: US 10,356,319 B2
(45) Date of Patent: Jul. 16, 2019

(54) PANORAMIC PORTALS FOR CONNECTING REMOTE SPACES

(71) Applicant: FUJI XEROX CO., LTD., Tokyo (JP)

(72) Inventors: Donald Kimber, Foster City, CA (US); James Vaughan, Sunnyvale, CA (US); Anthony Dunnigan, Palo Alto, CA (US); Pernilla Quarfordt, Los Alto, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 64 days.

(21) Appl. No.: 15/582,402

(22) Filed: Apr. 28, 2017

(65) Prior Publication Data

US 2018/0316856 A1    Nov. 1, 2018

(51) Int. Cl.
*H04N 5/232* (2006.01)
*G06T 3/00* (2006.01)
*H04N 9/31* (2006.01)
*G06F 3/14* (2006.01)
*H04N 5/247* (2006.01)

(52) U.S. Cl.
CPC ....... *H04N 5/23238* (2013.01); *G06F 3/1423* (2013.01); *G06T 3/005* (2013.01); *H04N 5/247* (2013.01); *H04N 9/3185* (2013.01)

(58) Field of Classification Search
CPC .. H04N 5/23238; H04N 5/247; H04N 9/3185; G06F 3/1423; G06T 3/005; G06T 3/0062
See application file for complete search history.

(56) References Cited

U.S. PATENT DOCUMENTS

| 8,576,370 B1* | 11/2013 | Sampica | G02F 1/1335 |
| | | | 349/155 |
| 9,426,419 B2 | 8/2016 | Wessling | |
| 2014/0198172 A1* | 7/2014 | Wessling | H04N 7/142 |
| | | | 348/14.1 |
| 2017/0363949 A1* | 12/2017 | Valente | H04N 13/344 |
| 2018/0130243 A1* | 5/2018 | Kim | G06T 3/0062 |
| 2018/0150994 A1* | 5/2018 | Foutzitzis | G06T 15/04 |

OTHER PUBLICATIONS

Avrahami, D., Biehl, J.T., Dunnigan, A. "Not Really There: Understanding Embodied Communication Affordances in Team Perception and Participation", 7 pages. 2015. CSCW.
Benko, Hrvoje, Wilson, Andrew D., "Multi-Point Interactions with Immersive Omnidirectional Visualizations in a Dome", 10 pages. ITS 2010: Displays, Nov. 7-10, 2010, Saabrucken, Germany. Copyright 2010 ACM 978-1-4503-0399-06/10-11.
(Continued)

*Primary Examiner* — Tsion B Owens
(74) *Attorney, Agent, or Firm* — Procopio, Cory, Hargreaves & Savitch LLP

(57) ABSTRACT

Example implementations described herein are directed to systems and methods for providing a panoramic video connection between one location and another, or between one location and a number of distributed remote viewers, which provides reciprocity in terms of awareness of who is viewing and what they are looking at. In example implementations described herein, radial displays present panoramic video from remote locations, or synthesized views of face shots positioned to indicate the viewing direction of remote viewers.

9 Claims, 8 Drawing Sheets

(56) References Cited

OTHER PUBLICATIONS

Bolton, John, et al., "BodiPod: Interacting with 3D Human Anatomy via a 360° Cylindrical Display", 4 pages. CHI 2012, May 5-10, 2012, Austin TX US. CHI'12, Interactivity Presentation, May 5-10, 2012, Austin, TX, US. ACM 978-1-4503-1016-1/12/05.

Dourish, Paul, Bly, Sara. "Portholes: Supporting Awareness in a Distributed Work Group." Proceedings of the SIGCHI Conference on Human Factors in Computing Systems. ACM, May 3-7, 1992. CHI '92.

Tobita, Hiroaki, Kuzi, Takuya, "Face-to-Avatar: Augmented Face-to-Face Communication with Aerotop Telepresence System". 4 pages. AVI '12, May 21-25, 2012, Capri Island, Italy.

Kimber, Don, Proppe, Patrick, Kratz, Sven, Vaughan, Jim, Liew, Bee, Severns, Don, & Su, Weiqing (Sep. 2014). "Polly: Telepresence from a Guide's Shoulder". 15 pages. In European Conference on Computer Vision (pp. 509-523). Springer International Publishing.

Matsumoto, Takashi, Hashimoto, Sho, Okude, Naohito, "Pileus The Internet-Ready Umbrella: Full-Embodied Web in a Real Space" 8 pages. Proceedings of the 4th International Conference on Mobile Technology, Applications, and Systems and the 1st international Symposium on Computer Human Interaction in Mobile Technology. ACM, 2007.

\* cited by examiner

Front Projection  Rear Projection

PANORAMIC PORTALS FOR CONNECTING REMOTE SPACES

BACKGROUND

Field

The present disclosure is related generally to video systems, and more specifically, to systems and methods for providing panoramic portals.

Related Art

Panoramic video is becoming increasingly widespread, and related art platforms support live streaming of 360° video. A camera can be placed at an interesting location, such as an event venue, and remote participants can watch the video and freely look around as if they are physically present. However, the related art arrangement lacks reciprocity, as people at the location of the panoramic camera lack awareness of who, or how many people are watching or where they are looking. This lack of reciprocity can create an unwelcome sense that the space is being viewed by unexpected viewers, or that the remote person is only an observer and not a participant.

One related art implementation to address the above problem involves bidirectional video connections with cameras and displays at each location. Such implementations provide a remote space and its participants a physical representation in the local space that allows more natural interaction between present and remote participants. However, related art implementations have involved standard (e.g. limited field-of-view perspective view) video, and there is no system that addresses such related art problems for 360° video.

SUMMARY

Example implementations are directed to panoramic portals, which involve a system that includes a camera, a display, and one or more processors. In example implementations, a portal is a device which provides viewers with a view into another space. In the present disclosure, panoramic video can involve video covering a 360 degree field of view in the 'longitudinal' (azimuthal) direction. The video may be represented and transmitted by 'equirectangular' images in which the x (horizontal) axis corresponds to longitude (or yaw) and the y axis corresponds to latitude (or pitch.) The panoramic video portal utilizes a panoramic camera and facilitates a suitable way of displaying panoramic video, which can be utilized in various distinct usage scenarios.

Example implementations of the present disclosure involve cylindrical, conical, spherical or other radial displays for the purpose of panoramic portals, and includes methods of use for these displays to support reciprocity and awareness.

Example implementations described herein can be implemented with flexible displays such as curved or flexible organic light emitting diodes (OLED), but can also be implemented as front or rear projection onto radial projection surfaces.

DETAILED DESCRIPTION

Figure 1:
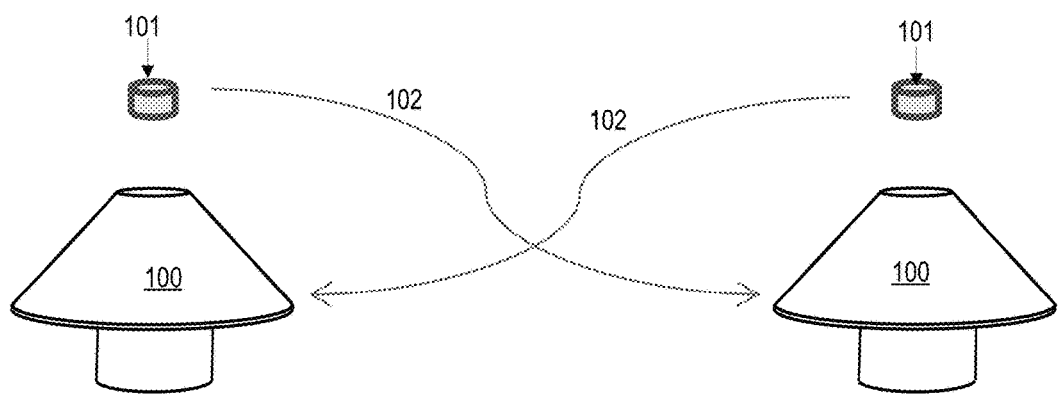
FIG. 1 illustrates an example system implementation of a multidirectional panoramic wormhole, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein include systems and methods for providing reciprocity in case of substantially 360° video. Related art video porthole and video-conferencing methods do not provide such reciprocity. Example implementations can be further configured to show remote distributed viewers, and where the viewers are looking within a live streamed 360° video stream.

Example implementations described herein can also involve an interface in which view can be rotated, possibly by swipe gesture, or by automatic methods. Example implementations described herein can be configured to display a remote participant which indicates where they are looking without requiring moving mechanisms, and can be configured to present stabilized display for portable telepresence devices.

FIG. 1 illustrates an example system implementation of a bidirectional panoramic wormhole, in accordance with an example implementation. In example implementations, the wormhole is a bidirectional portal which allows viewers in two remote spaces to see into each other's space. In the example system, there are radial displays 100, and panoramic cameras 101. Video transmissions 102 are transmitted from panoramic cameras 101 to the corresponding counterpart radial display 100. In the example of FIG. 1, the panoramic camera and display at one location are connected to a camera and display at another. People around the portal at one location see through the portal to the remote location, and can see the people around that remote portal, and vice versa. In example implementations, the radial displays 100 are disposed at remote locations from each other and are managed by a system as described in FIG. 7 to facilitate video imagery between the radial displays 100.

In another example implementation, a single panoramic portal can be utilized instead of a bidirectional panoramic wormhole system. In such example implementations, there can be remote viewers at many locations, watching on mobile devices, laptops, web browsers, and so on. Such example implementations can facilitate a one-to-many configuration with one special location having the panoramic camera and radial display, and potentially many other viewers.

In such a configuration, indicators of remote people can be placed on the portal, to show where they are looking. Such indicators could involve indicators such as dots or boxes showing where the remote people are looking, or could be pictures, or even live video of the remote viewers (e.g. the viewer faces).

In another example implementation, mirroring can be implemented wherein the radial display shows the live video from the camera at the same location. Such implementations can be utilized while the video is recorded. Such implementations can be used in a situation where there is an activity proximate to the portal, such as a meeting, or public or artistic event such as a dance, which is being recorded. In an example implementation with stadiums having 360° cameras, such video feed can be utilized to display the entire stadium as the sporting event is occurring, thereby allowing the user to view a sporting event in any desired direction from the camera position.

In another example implementation, asynchronous implementations can also be utilized, such as for recorded playback. The portal can show local or remote panoramic video that was recorded at an earlier time. As people are watching or interacting with the portal, they can also be recorded. Such implementations can support an asynchronous activity such as dance, in which some dancers are recorded, and then later other dancers (or the same) participate in the dance.

In example implementations, the display can be rotated in software to provide a spinning effect, such that the remote viewer can virtually move to a different position. Such implementations can involve detecting a 'swipe' gesture, either using a touch sensitive surface or a scheme such as RGB and depth sensors for tracking.

In another example implementation, the display can also introduce a rotation based on tracking or other video analytics. For example, if one person is looking at a local portal, seeing another person at a remote space, rotations could be applied as each person is moving around so that they would continue to see each other as they look at the displays. In another example implementation, eye gaze detection can be utilized to determine areas of interest. For example, if someone is looking at a portion of the display not centered towards them, after a period of time, the display could rotate to bring the apparent area of interest closed to the viewer.

Figure 2A:
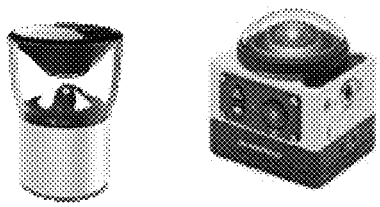
FIGS. 2(a) to 2(d) illustrate example cameras that can be utilized in example implementations.
Figure 2B:
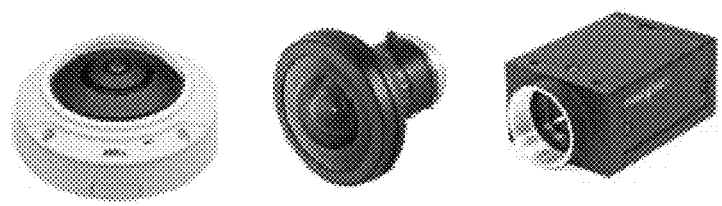
Figure 2C:
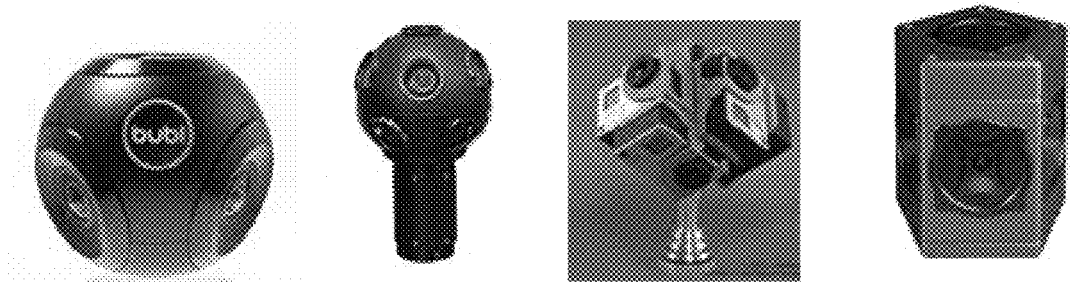
Figure 2D:
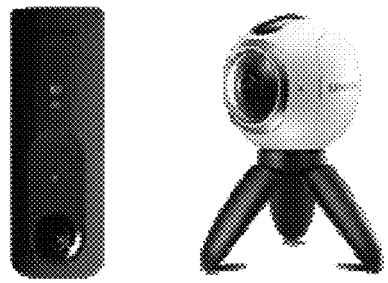

FIGS. 2(a) to 2(d) illustrate example cameras that can be utilized in example implementations. Video is collected with 360° cameras. Examples of such cameras can include catadioptric cameras as illustrated in FIG. 2(a). FIG. 2(b) illustrates example fisheye lens systems. FIG. 2(c) illustrates example panoramic camera systems. FIG. 2(d) illustrates example live streaming cameras, which can include drivers that make equirectangular images available. Such images can be provided locally, or broadcast using image protocols according to the desired implementation. Such images can also be stored for later playback, and also immediately after a recording. Depending on the desired implementation, any of the cameras can be used interchangeably and across camera types with the appropriate software implementation.

In example implementations, a 3D scene is created wherein equirectangular images are texture-mapped onto geometry such as a sphere. The virtual camera is rotated to provide a view at any angle. Remote users may view the panoramic video as standard perspective images with highly responsive panning based on mouse, orientation of mobile devices, or head mounted display. The view direction for each viewer is reported to other viewers or special display modes using socket.io messaging. In example implementations, the camera may be mounted on the radial displays in the example implementation, as illustrated in FIGS. 6(a) to 6(d), to capture a 360° view of the area surrounding the radial display.

Figure 3A:
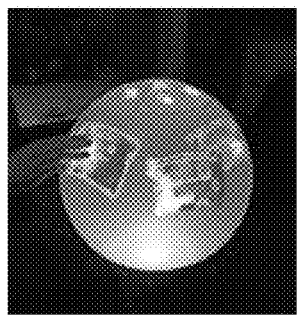
FIGS. 3(a) to 3(f) illustrate example spherical and cylindrical displays, in accordance with an example implementation.
Figure 3B:
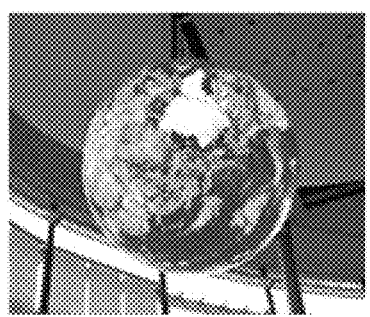
Figure 3C:
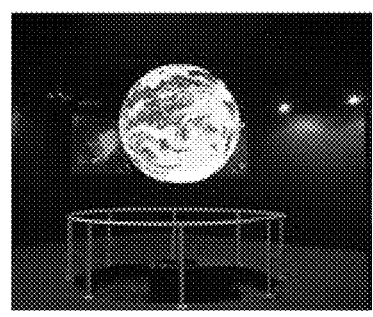
Figure 3D:
Figure 3E:
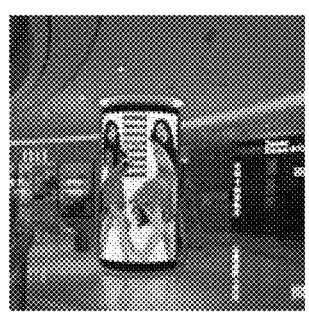
Figure 3F:

FIGS. 3(a) to 3(f) illustrate example spherical and cylindrical displays, in accordance with an example implementation. Specifically, FIGS. 3(a) to 3(c) illustrate example spherical displays, such as multi-touch spherical displays, OLED spherical displays, or sphere displays. FIGS. 3(d) to 3(f) illustrate example cylindrical displays, such as LED spherical displays. In example implementations, such displays can be driven by a management system or an apparatus to display panoramic images as described herein.

Figure 4A:
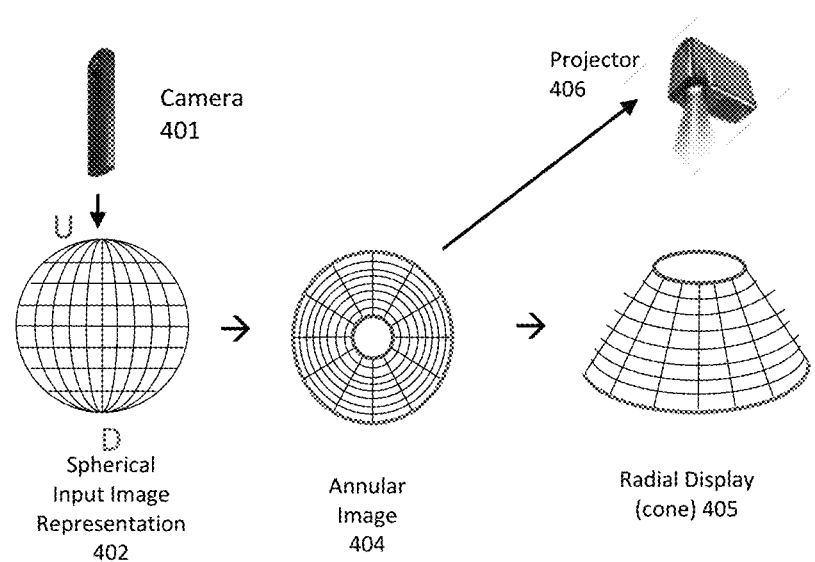
FIGS. 4(a) and 4(b) illustrates an example flow, in accordance with an example implementation.

FIG. 4(a) illustrates an example flow, in accordance with an example implementation. Specifically, FIG. 4(a) illustrates an example flow wherein video received from spherical camera 401 is converted to equirectangular images, then processed, e.g., broadcast, streamed or stored. The video is then displayed by mapping the equirectangular images to a suitable radial display. The radial display can be a made of LEDs or other active display materials to directly display the received images. Alternatively, the equirectangular images can be mapped to annular images and projected by a projector onto the display surface. In a projection implementation, the radial surface can be a physical radial surface, such as a cone, hemisphere, and so on.

In an example implementation as described in FIG. 4(a), the spherical camera 401 records images as a spherical input image representation 402. The spherical input image representation is then transformed into an annular image 404 through any desired implementation. The annular image 404 is then displayed by the radial display 405, or projected onto the radial display 405 through a projector 406. In example implementations, the spherical input image representation 402 can be provided by cameras that are configured to provide an equirectangular image, or other images that can represent a spherical image such as dual fisheye images, cube map images, and so on depending on the camera and the desired implementation.

Figure 5A:
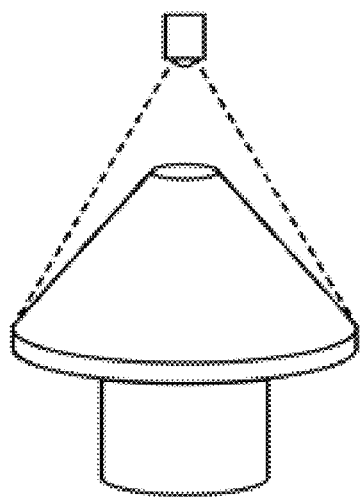
FIGS. 5(a) and 5(b) illustrate example implementations involving front projection and rear projection, respectively, on a conical surface.
Figure 5B:
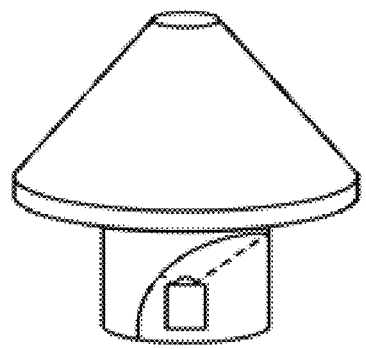

In an example implementation, downward projection can be utilized from a projector mounted above the radial display 405, however the present disclosure is not limited to such an implementation. Other example implementations can involve an upward facing projector on the floor or within the radial display 405, configured to project onto the rear side of a suitable rear projection surface such as polyethylene. For example, rear projection can be implemented through use of a small portable projector onto the inside of a radial display surface such as a plastic cone. FIGS. 5(a) and 5(b) illustrate example implementations involving front projection and rear projection, respectively, on a conical surface.

As shown in the example flow of FIG. 4(a), a camera 401 projects recorded images in the form of a spherical input image representation onto a sphere as shown at 402. The spherical input image representation 402 is wrapped into an annular image 404 wherein, for example, the top of the spherical input image representation 402 becomes the inner circle, and the bottom becomes the outer circle. In such an implementation, the image projected downward onto the radial display 405 is conducted such that the top of the radial display 405 displays the top of the image and the outside is the bottom. However, the location of the projector may be in other locations as noted herein, and can be placed depending on the desired implementation.

Figure 4B:
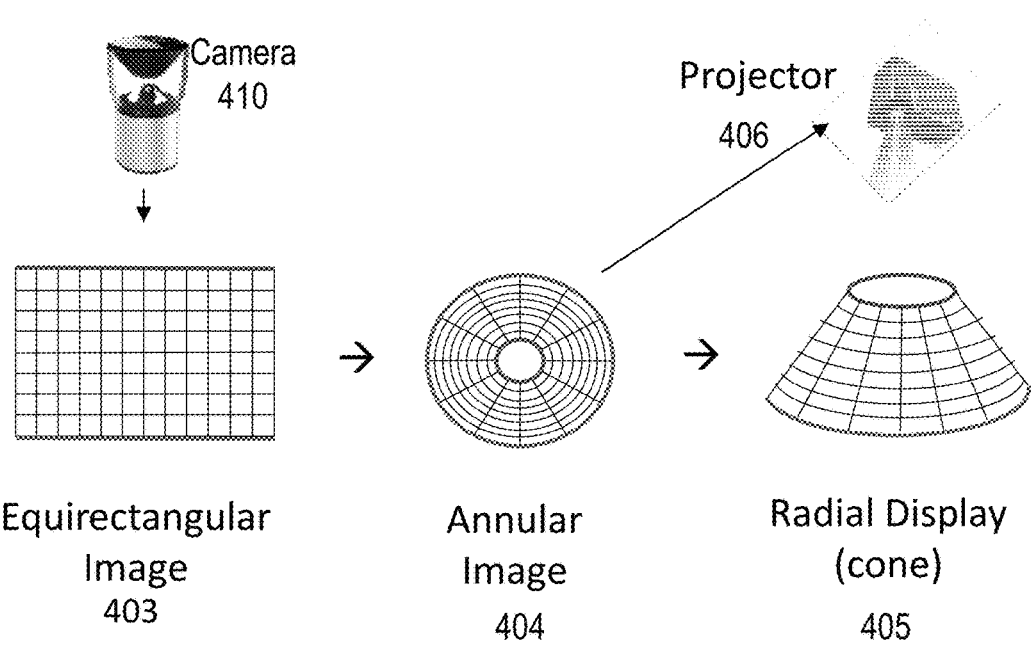

FIG. 4(b) illustrates an example flow, in accordance with an example implementation. Specifically, FIG. 4(b) illustrates an example involving a camera 410 that is configured to record and provide equirectangular images, such as a camera configured to record panoramic images, security cameras, or other cameras according to the desired implementation. In such cases, the equirectangular images 403 can be transformed into annular images 404 through the desired implementation.

In additional example implementations, projector 406 can be omitted if the radial display 405 is configured to receive and display equirectangular images, such as a warped OLED display or through other configurations according to the desired implementation. For example, a portable version of the panoramic portal could be created using a small curved OLED display.

FIGS. 5(a) and 5(b) illustrate example implementations involving front projection and rear projection, respectively, on a conical surface. As shown in the example of FIG. 5(a), the projector is placed above the radial display and projected downwards. In the example of the rear projection of FIG. 5(b), the projector is placed within the radial display and projects outwards throughout the radial display.

Figure 6A:
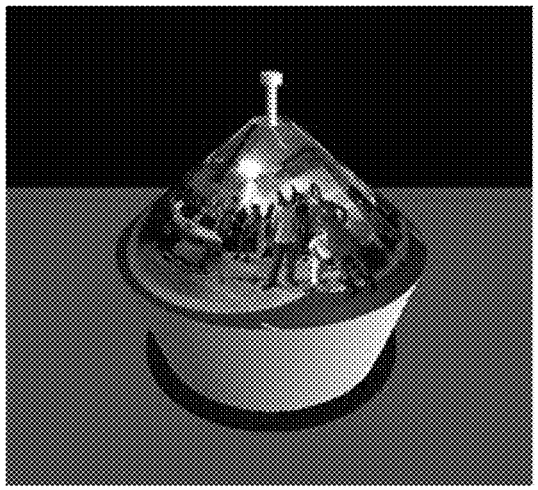
FIGS. 6(a) to 6(d) illustrate example display shapes, in accordance with an example implementation.
Figure 6B:
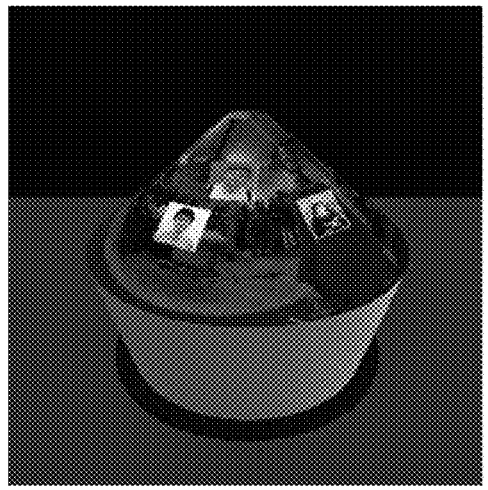
Figure 6C:
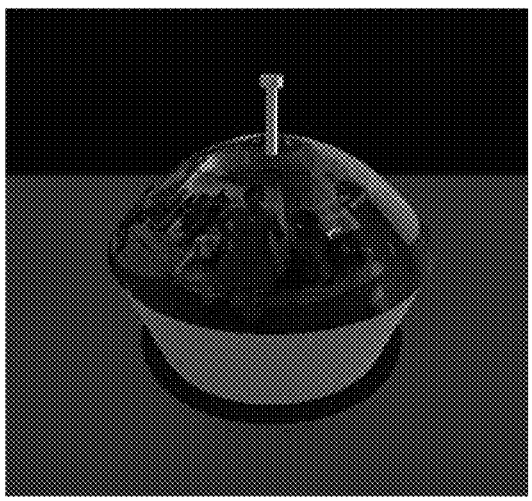
Figure 6D:
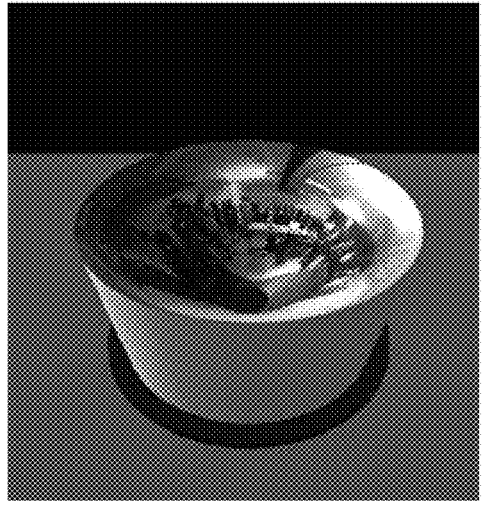

In example implementations, a variety of display surface shapes could be used depending on the desired implementation. FIGS. 6(a) to 6(d) illustrate example display shapes, in accordance with an example implementation. Each of the example display shapes involve symmetric radial shapes where an annular image can be projected. In the example of FIG. 6(a), the shape is a convex configuration involving a camera on a pole. In the example of FIG. 6(b), the display is configured to provide the view direction of remote viewers. In the example of FIG. 6(c), the shape is a convex surface with a portion of a hemisphere. In the example of FIG. 6(d), the display is a concave conical surface in which the viewer can look down into the display. Depending on the desired implementation, the concave case can give better spatial orientation for some applications, because a person looking in a given yaw direction can be aligned with the view from the camera in that direction. Similarly, if the projection is onto a bowl shape, and a person is viewing looking down into the bowl a lower distortion view can be achievable.

If spherical video is projected from the center of a sphere onto the inside surface of the sphere, and is viewed from near the center, a relatively undistorted view can be scene looking in any direction. Other methods for presenting the full video will create some kind of distortion, including any projection of the video onto a radial display. However, users have shown to be capable of looking at oblique or distorted images and understanding the images, so such distortion can still be acceptable depending on the desired implementation. For example, in a symmetric radial shape such as a cylinder involving projectors, multiple projectors will be needed to provide a radial display with reduced distortion. However, in example implementations of a conical radial display with projector, only a single projector is needed to project an annular image, as the conical radial shape can provide relatively undistorted views of the annular image.

Figure 7:
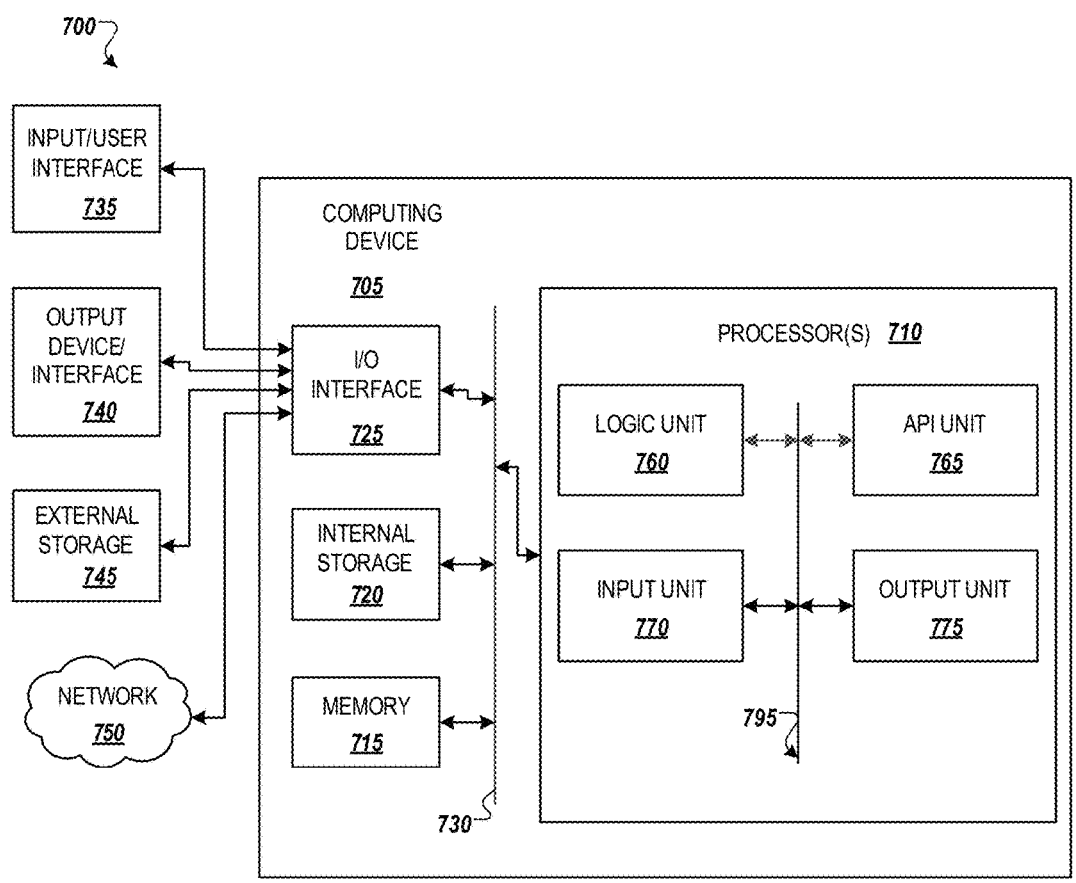
FIG. 7 illustrates an example computing environment with an example computer device suitable for use in some example implementations.

FIG. 7 illustrates an example computing environment with an example computer device suitable for use in some example implementations, such as an apparatus or management system configured to manage a radial display as illustrated, for example, in FIGS. 3(a) to 3(f) or FIGS. 5(a) and 5(b) or multiple radial displays, each having a camera as illustrated in FIG. 1.

Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computer device 705. I/O interface 725 is also configured to receive images from cameras or provide images to projectors or displays, depending on the desired implementation.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via I/O interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide output based on the calculations described in example implementations.

In example implementations, processor(s) 710 may be configured to transform a received image into an annular image; and project the annular image onto the radial display as illustrated in FIG. 4(*a*) or 4(*b*). The received image can be an equirectangular image, which can be provided by a panoramic camera configured to record equirectangular or panoramic images and provide the recorded equirectangular images as the received images as illustrated in FIG. 4(*b*). The received images can also be spherical input image representations which can be provided by a camera configured to record equirectangular, fish eye, or other image representations and provide the recorded image representations as received images as illustrated in FIG. 4(*a*). In such an example implementation, processor(s) may be configured to transform the received image from a spherical image representation into the annular image as illustrated in FIG. 4(*a*).

One example implementation uses a conical radial display, wherein a projector is utilized to project downwards onto the conical radial display, the conical radial display oriented such that the wider portion of the conical radial display is further away from the projector than the narrower portion of the conical radial display, wherein the processor(s) 710 may be configured to project the annular image onto the conical radial display through use of the projector such that the projector projects the annular image at a higher intensity for the wider portions than the narrower portions as illustrated in FIGS. 4(*a*) and 5(*a*). In this manner, the projector projects the outer portions of the annular image with more light intensity at the wider portion of the conical radial display to maintain uniform light intensity throughout the display, as the light intensity may be faded at the farther regions compared to the top of the conical radial display.

In another example implementation, the projector is located within the conical radial display as illustrated, for example, in FIG. 5(*b*) to provide rear projection. In such an example, the conical radial display is oriented such that the narrower portion of the conical radial display is further away from the projector than the wider portion of the conical radial display as illustrated in FIG. 5(*b*).

In example implementations, other symmetric radial displays are also possible and can be configured to be driven by the processor(s) 710 as illustrated in FIGS. 3(*a*) to 3(*f*) and FIGS. 6(*a*) to 6(*d*). In such an example implementation, the processor(s) 710 may be configured to project the annular image onto the radial display through driving the symmetrical radial display to display the annular image.

Depending on the desired implementation, a camera, such as those illustrated in FIGS. 2(*a*) to 2(*d*), may be attached to the radial display, wherein the received image involves previously recorded images from the camera, thereby providing a playback of everything witnessed by the camera.

Depending on the desired implementation, an interface may be provided to rotate the projection of the annular image on the radial display. Such an interface may be gesture based, may be a physical device configured to rotate the radial display, or can be done automatically by the projector or by processor(s) 710 depending on the desired implementation.

In example implementations of a management system, the management system can manage a first panoramic portal having a first radial display, a first camera attached to the first radial display, the first camera configured to record first images; a second radial display; and a second camera attached to the second radial display, the second camera configured to record second images as illustrated in FIG. 1. The first and second panoramic portals may be communicatively coupled by any desired implementation, such as local area network (LAN), wide area network (WAN), over the internet, and so on.

In example implementations of a management system, processor(s) 710 can be configured to facilitate video streaming between the first panoramic portal and the second panoramic portal as illustrated in FIG. 1, and be configured to transform the second images into first annular images; project the first annular images onto the first radial display; transform the first images into second annular images; and project the second annular images onto the second radial display as illustrated in FIG. 1 through the flow as described in FIGS. 4(*a*) and 4(*b*). Depending on the desired implementation, at least one or both of the first images and the second images are equirectangular images as provided by panoramic cameras attached to at least one of the first radial display and the second radial display as illustrated in FIG. 1.

Depending on the desired implementation, at least one of the first images and the second images can be spherical image representations, as provided by cameras attached to at least one of the first radial display and the second radial display as illustrated in FIG. 1. In such an example implementation, processor(s) can be configured to transform the at least one of the first images and the second images into annular images through a transform of spherical image representations into the annular images as illustrated in FIG. 4(*a*).

Depending on the desired implementation, at least one or both of the radial displays can be a conical radial display, wherein a projector can be configured to project downwards onto the conical radial display as illustrated in FIG. 5(a). The conical radial display can oriented such that the wider portion of the conical radial display is further away from the projector than the narrower portion of the conical radial display, wherein the processor(s) 710 can be configured to project the first annular images onto the conical radial display through use of the projector such that the projector projects the first annular images at a higher intensity for the wider portions than the narrower portions. In this manner, the projector projects the outer portions of the annular image with more light intensity at the wider portion of the conical radial display to maintain uniform light intensity throughout the display, as the light intensity may be faded at the farther regions compared to the top of the conical radial display.

Depending on the desired implementations, at least one of the radial displays can be a conical radial display with a projector located within the conical radial display as illustrated in FIG. 5(b), the conical radial display oriented such that the narrower portion of the conical radial display is further away from the projector than the wider portion of the conical radial display.

In example implementations of the management system, some or all of the radial displays can be symmetric radial display configured to be driven by the processor(s) 710 to display the annular image, such as illustrated in FIGS. 3(a) to 3(f).

In the management system for FIG. 1, the cameras for both radial displays can be configured to provide images as live streaming video to the management system, and the annular images can be 360 degree live video streams provided by the camera of other radial displays to facilitate conferencing and communications between radial displays in the form of a 360 degree live stream video. Each radial display can also include an interface configured to rotate the projection of the first annular images on the radial display. Such an interface may be gesture based, may be a physical device configured to rotate the radial display, or can be done automatically by the projector or by processor(s) 710 depending on the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A system, comprising:
   a radial display; and
   an apparatus configured to manage the radial display, the apparatus comprising:
   a processor, configured to:
   transform a received image into another image; and
   display the another image onto the radial display;
   wherein the received image is a spherical image representation, wherein the processor is configured to transform the received image into the another image through a transformation into an annular image to be projected onto the radial display, wherein the processor is configured to display the another image onto the radial display through projecting the annular image onto the radial display.

2. The system of claim 1, wherein the received image is an equirectangular image.

3. The system of claim 2, further comprising a panoramic camera configured to generate equirectangular images and provide the equirectangular images as the received image.

4. The system of claim 1, further comprising a camera configured to form spherical image representations and provide the spherical image representations as the received image.

5. The system of claim 1, wherein the radial display is a conical radial display, wherein the system further comprises a projector configured to project downwards onto the conical radial display, the conical radial display oriented such that the wider portion of the conical radial display is further away from the projector than the narrower portion of the conical radial display, wherein the processor is configured to display the another image onto the conical radial display through use of the projector such that the projector projects the another image at a higher intensity for the wider portions than the narrower portions.

6. The system of claim 1, wherein the radial display is a conical radial display, wherein the system further comprises a projector located within the conical radial display, the conical radial display oriented such that the narrower portion of the conical radial display is further away from the projector than the wider portion of the conical radial display, wherein the processor is configured to display the another image onto the conical radial display through use of the projector.

7. The system of claim 1, wherein the radial display is a curved or flexible display configured to directly render pixels of equirectangular images provided by the processor.

8. The system of claim 1, wherein the system further comprises a camera attached to the radial display, wherein the received image comprises previously received images from the camera.

9. The system of claim 1, further comprising an interface configured to rotate the projection of the another image on the radial display.

* * * * *